Oct. 18, 1938.   D. G. LOGAN   2,133,551
CORD REEL
Filed July 23, 1937   3 Sheets-Sheet 2

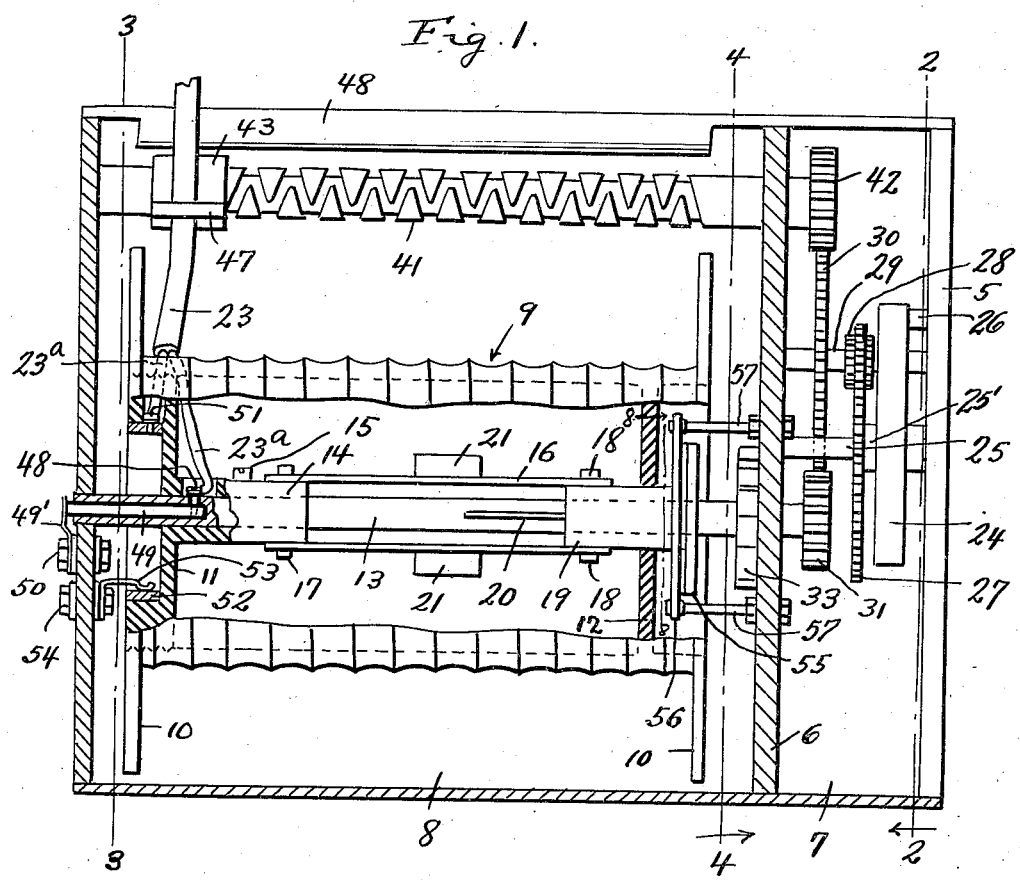
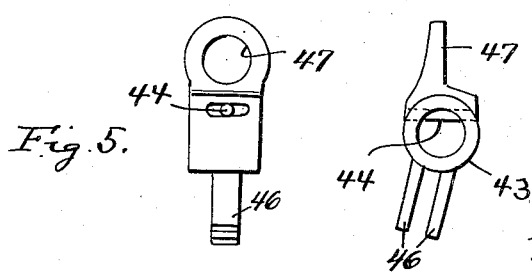
Fig. 1.
Fig. 5.
Fig. 6.

Inventor.
Donald Gibson Logan

By Clarence A. O'Brien
Hyman Berman
Attorneys

Oct. 18, 1938.  D. G. LOGAN  2,133,551
CORD REEL
Filed July 23, 1937  3 Sheets-Sheet 3

Inventor
Donald Gibson Logan
By Clarence A. O'Brien
Hyman Berman
Attorneys

Patented Oct. 18, 1938

2,133,551

UNITED STATES PATENT OFFICE 2,133,551

CORD REEL

Donald Gibson Logan, Shawnee, Okla.

Application July 23, 1937, Serial No. 155,303

1 Claim. (Cl. 242—107)

This invention relates to reels and more particularly to a reel designed for having wound thereon an electric cord.

An object of the present invention is to provide a reel of the character described for the winding thereon of the electric cord associated with an electric vacuum cleaner.

The invention together with its objects and advantages will be best understood from a study of the following description taken in connection with the accompanying drawings wherein:—

Figure 1 is a horizontal sectional view taken substantially on the line 1—1 of Figure 2.

Figures 2, 3 and 4 are sectional views taken substantially on the lines 2—2, 3—3, and 4—4 respectively of Figure 1.

Figure 5 is an elevational view of a travelling guide member.

Figure 6 is an elevational view of the guide member taken at right angles to Figure 5.

Figure 2:
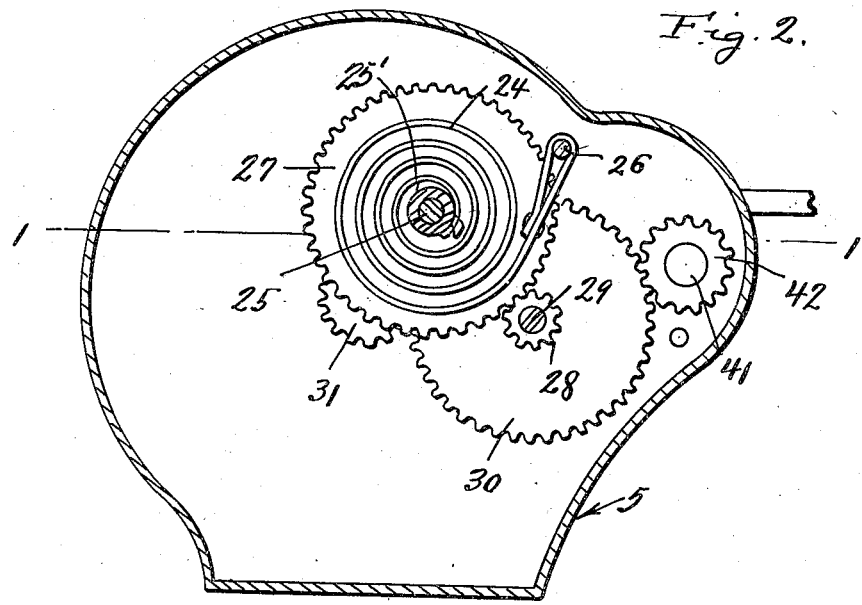
Figures 7, 8:
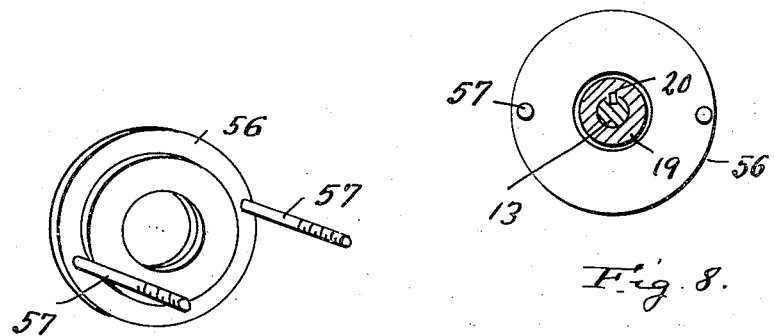
Figure 7 is a perspective view of a fixed brake disk.
Figure 8 is a section on line 8—8 of Figure 1.

Referring to the drawings by reference numerals it will be seen that in the preferred embodiment thereof the improved electric cord reel comprises a casing 5 of suitable shape and configuration and divided by a partition 6 into a relatively small compartment 7 and a larger compartment 8.

Mounted in the compartment 8 is a reel or spool indicated by the reference numeral 9.

The reel 9 comprises a hollow cylindrical drum portion having flanges 10. Internally of the drum part thereof the reel 9 is provided with end walls or partitions 11 and 12 and the wall or partition 11 has an inwardly extending sleeve 14 connected with its central portion, said partition 11 having an aperture therein registering with the bore of the sleeve and a shaft 13 passing through the sleeve and said aperture, the shaft being fastened to the sleeve by a screw 15 which passes through the sleeve and engages the shaft. The other partition 12 has a large central aperture therein thru which extends a collar 19 which has sliding and rotary movement in the aperture and this collar 19 also has sliding movement on the shaft 13 that is caused to rotate with the shaft by having a keyway therein for receiving a key 20 on the shaft.

Sleeve 14 forms, as it were, the fixed collar of a governor, the other parts of which consist of spring weight arms 16—16 suitably anchored at one end as at 17 to the collar 14 and secured at their other ends as at 18 to the sliding collar 19.

By having the collar 19 keyed to the shaft 13 the spring arms 16 will be relieved of the strain incidental to the starting and stopping of the reel. Intermediate the ends thereof the governor arms 16 are provided with weights 21.

For driving the reel 9 to rotate the same in a counter-clockwise direction for winding the electric cord 23 thereon there is provided in the chamber 7 of casing 5 a spring motor which includes a spring 24 one end of which is fixed to a hub 25' on shaft 25 and the other end of which is anchored as at 26. The hub may be rotatably mounted on the shaft 25 or the hub may be attached to the shaft in any suitable manner and the shaft rotatably mounted in the casing. Carried by the hub part 25' of the spring is a gear 27 that is in mesh with a pinion 28 on a shaft 29 also suitably journaled in the compartment 7 of the casing. On shaft 29 is a gear 30 that is in mesh with a pinion gear 31 on one end of shaft 13 extending into the compartment 7.

To prevent retrograde movement of the reel 9 while the cord 23 is being paid out therefrom there is provided on the shaft 13 a ratchet wheel 33 which is cooperable with a dog 34.

Figure 4:
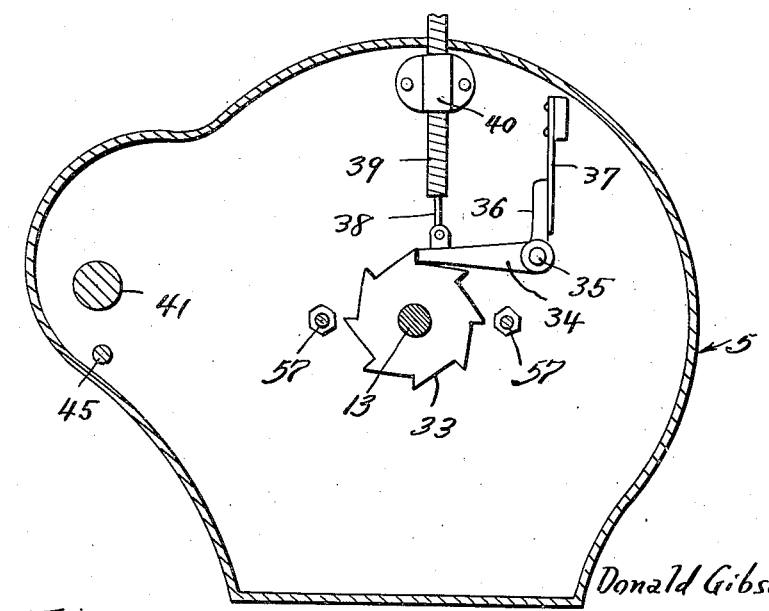

As shown in Figure 4 dog 34 is pivoted as at 35 and has an end portion 36 bearing against a suitably anchored spring 37 that acts to normally urge the dog 34 into engagement with the ratchet wheel 33.

For moving the dog 34 out of the path of the ratchet wheel 33 to permit the reel 9 to rotate in a direction to wind the electric cord 33 thereon there is provided a pull wire 38 suitably secured at one end to the dog 34 and extending therefrom through a wall of the casing to terminate in a suitable handle or the like (not shown) to facilitate manipulation of the wire 38. Wire 38 is trained through a suitable sheathing 39 an end portion of which is anchored within the casing 5 through the medium of a bracket 40.

To distribute the cord 23 over the reel 9 as it is being wound on the reel there is also suitably journaled in the casing 5 a double reverse threaded screw 41 that has an end thereof extending into compartment 7. On said end of the screw 41 there is a pinion 42 that is in mesh with gear 30. Thus it will be seen that the screw 41 will rotate in synchronism with the reel 9 during the winding or paying out of the electric cord relative to the reel 9.

Associated with the screw 41 to travel therealong is a cord guide member 43 equipped with a pin 44 that rides in the groove of the screw 41 to cause the member 43 to travel lengthwise of the screw.

Figure 3:
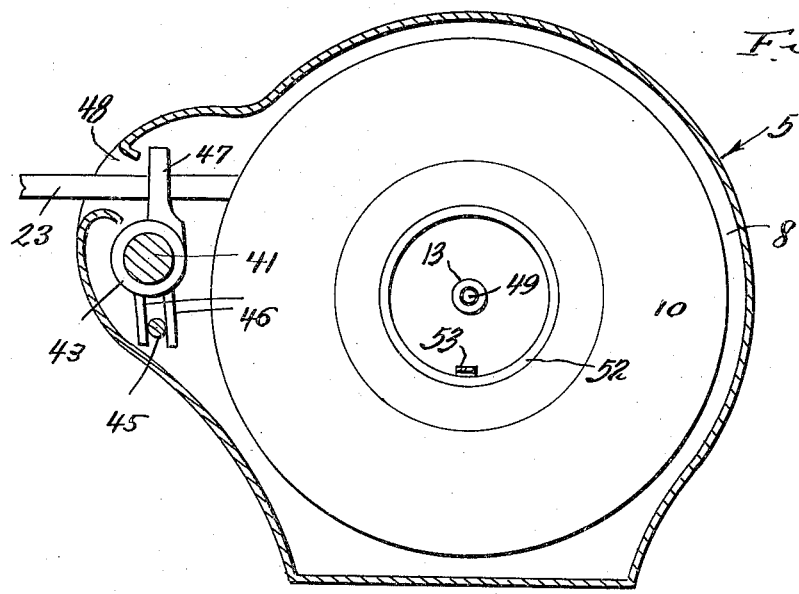

Rotative movement of the member 43 is prevented through the medium of a fixed guide rod 45 and a pair of depending lugs 46 that depend from the member 43 and straddle the rod 45 as shown in Figure 3.

Member 43 also includes an apertured lug or eye 47 through which the cord 23 is trained. As shown the cord 23 passes through a suitable slot 48 provided therefor in the wall of the casing 5.

As shown in Figure 1 one of the wires 23a of the cord 23 is electrically connected through the medium of a screw 48 to a contact pin 49 accommodated within an axial recess at one end of the shaft 13 and having a free extremity projecting outwardly beyond one end of the shaft and engaging a contact element 49' connected to a terminal bolt 50 suitably mounted on and insulated from an end wall of the casing 5.

The other wire, 23b of the cord 23 is electrically connected through the medium of a screw 51 with a contact ring 52 suitably confined within one end of the reel 9 and with which a contact finger 53 has wiping engagement. Contact finger 53 is suitably anchored to an adjacent wall of the casing through the medium of a terminal bolt 54. Thus the wire 23 may be connected in a suitable electric circuit for supplying current to the motor of the vacuum cleaner or other device with which it may be associated.

Also to prevent free rotative movement of the reel 9, and tending to reduce the speed of the reel 9 as the cord 23 is either being paid out therefrom or wound thereon, there is provided on the governor sleeve 19 at one end of the latter a movable brake flange or disk 55 that cooperates with a fixed brake disk 56 disposed concentric to the sleeve 19 and secured within the path of the brake element 55 through the medium of bolts 57 that extend inwardly of the compartment 8 from the partition wall 6 as shown in Figure 1. Thus it will be seen that as the governor arms 16 swing outwardly in response to centrifugal force and sleeve 19 moves inwardly brake disk 55 will move into frictional contact with brake disk 56 for retarding the speed of rotation of the reel 9.

In connection with the operation of the reel it will be fully appreciated that as the electric cord 23 is unwound or paid out from reel 9, spring motor 24 is automatically wound.

It is thought that a clear understanding of the construction, utility and advantages of a reel of this character will be had without a more detailed description thereof.

Having thus described the invention what is claimed as new is:

In a device of the class described, a casing, a rotary shaft therein, a reel carried by the shaft, a governor in the reel and including a member attached to the shaft, a second member having sliding but non-rotatable movement on the shaft, flexible arms connecting the two members together, weights on the arms, a brake plate connected with the outer end of the sliding member and a stationary brake plate through which the sliding member passes and with which the first brake plate will engage when the slidable member is moved by outward movement of the arms of the governor, a spring motor for rotating the shaft and reel in a direction to wind the cable upon the reel, and ratchet means for releasably holding the reel and shaft against rotary movement by the spring motor.

DONALD GIBSON LOGAN.